US011388193B2

United States Patent
Damian (10) Patent No.: US 11,388,193 B2
(45) Date of Patent: *Jul. 12, 2022

(54) SYSTEMS AND METHODS FOR DETECTING ONLINE FRAUD (71) Applicant: Bitdefender IPR Management Ltd., Nicosia (CY)

(72) Inventor: Alin O. Damian, Buzau (RO)

(73) Assignee: Bitdefender IPR Management Ltd., Nicosia (CY)

( * ) Notice: Subject to any disclaimer, the term of this patent is extended or adjusted under 35 U.S.C. 154(b) by 508 days.

This patent is subject to a terminal disclaimer.

(21) Appl. No.: 16/233,750

(22) Filed: Dec. 27, 2018

(65) Prior Publication Data

US 2019/0132357 A1 May 2, 2019

Related U.S. Application Data (63) Continuation of application No. 15/206,761, filed on Jul. 11, 2016, now Pat. No. 10,171,497.

(51) Int. Cl.
*G08B 23/00* (2006.01)
*H04L 9/40* (2022.01)
(Continued)

(52) U.S. Cl.
CPC ...... *H04L 63/1483* (2013.01); *G06F 16/9535* (2019.01); *G06F 21/554* (2013.01);
(Continued)

(58) Field of Classification Search
CPC ..... G06F 2221/0706; G06F 2221/2119; G06F 16/9535; G06F 21/554; H04L 61/15;
(Continued)

(56) References Cited

U.S. PATENT DOCUMENTS

| 8,528,084 B1 * | 9/2013 | Dingle | G06F 16/35 726/22 |
| 2011/0112931 A1 * | 5/2011 | Hu | G06Q 20/382 705/26.35 |

(Continued)

OTHER PUBLICATIONS

Gastellier-Prevost, A Dual Approach to Detect Pharming Attacks the Client Side, Feb. 10, 2011, IEEE, pp. 1-5. (Year: 2011).*

(Continued)

*Primary Examiner* — Luu T Pham
*Assistant Examiner* — Jenise E Jackson
(74) *Attorney, Agent, or Firm* — Law Office of Andrei D. Popovici, P.C.

(57) ABSTRACT

Described systems and methods enable a swift and efficient detection of fraudulent Internet domains, i.e., domains used to host or distribute fraudulent electronic documents such as fraudulent webpages and electronic messages. Some embodiments use a reverse IP analysis to select a set of fraud candidates from among a set of domains hosted at the same IP address as a known fraudulent domain. The candidate set is further filtered according to domain registration data. Online content hosted at each filtered candidate domain is further analyzed to identify truly fraudulent domains. A security module may then prevent users from accessing a content of such domains.

19 Claims, 6 Drawing Sheets

(51) Int. Cl.
  *G06F 16/9535* (2019.01)
  *G06F 21/55* (2013.01)
  *H04L 61/4511* (2022.01)
(52) U.S. Cl.
  CPC ...... *H04L 61/4511* (2022.05); *H04L 63/0236* (2013.01); *H04L 63/1416* (2013.01); *H04L 63/1425* (2013.01)
(58) Field of Classification Search
  CPC ... H04L 63/0236; H04L 61/106; H04L 61/10; H04L 61/1511; H04L 63/1483; H04L 61/4511; H04L 63/1416; H04L 63/1425
  USPC .......................................................... 726/22
  See application file for complete search history.

(56) References Cited

U.S. PATENT DOCUMENTS

| | | | | |
|---|---|---|---|---|
| 2015/0278817 | A1* | 10/2015 | Abifaker | G06Q 20/4016 |
| | | | | 705/44 |
| 2015/0350229 | A1* | 12/2015 | Mitchell | G06F 16/955 |
| | | | | 726/23 |
| 2016/0191548 | A1* | 6/2016 | Smith | H04L 63/1416 |
| | | | | 726/23 |
| 2017/0099314 | A1* | 4/2017 | Klatt | H04L 61/1511 |
| 2017/0318049 | A1* | 11/2017 | Maylor | H04L 63/1433 |

OTHER PUBLICATIONS

Allan et al, Towards Fraud Detection Methodologies, May 23, 2010, IEEE, pp. 1-6. (Year: 2010).*

* cited by examiner

SYSTEMS AND METHODS FOR DETECTING ONLINE FRAUD

RELATED APPLICATIONS

This application is a continuation of U.S. patent application Ser. No. 15/206,761, filed on Jul. 11, 2016, entitled "Systems and Methods for Detecting Online Fraud," which is scheduled to issue on Jan. 1, 2019 as U.S. Pat. No. 10,171,497, the entire contents of which are incorporated by reference herein.

BACKGROUND

The invention relates to computer security systems and methods, and in particular to systems and methods for detecting online fraud, e.g., fraudulent webpages.

The rapid development of electronic communications, online commerce, and services such as online banking commerce has been accompanied by a rise in electronic crime. Internet fraud, especially in the form of phishing and identity theft, has been posing an increasing threat to Internet users worldwide. Sensitive identity information and credit card details obtained fraudulently by international criminal networks operating on the Internet are used to fund various online transactions, and/or are further sold to third parties. Besides direct financial damage to individuals, Internet fraud also causes a range of unwanted side effects, such as increased security costs for companies, higher retail prices and banking fees, declining stock values, lower wages and decreased tax revenue.

In an exemplary phishing attempt, a fake website masquerades as a genuine webpage belonging to an online retailer or a financial institution, inviting the user to enter some personal information (e.g., username, password) and/or financial information (e.g. credit card number, account number, security code). Once the information is submitted by the unsuspecting user, it may be harvested by the fake website. Additionally, the user may be directed to another webpage which may install malicious software on the user's computer. The malicious software (e.g., viruses, Trojans) may continue to steal personal information by recording the keys pressed by the user while visiting certain webpages, and may transform the user's computer into a platform for launching other malicious attacks.

Software running on an Internet user's computer system may be used to identify fraudulent web documents and to issue a warning and/or block access to such documents. Several approaches have been proposed for identifying fraudulent webpages. Exemplary strategies include matching a webpage's address to a list of known fraudulent and/or trusted addresses (techniques termed black- and white-listing, respectively). To avoid such detection, fraudsters frequently change the address of their websites.

There is a persisting interest in developing methods to detect and prevent online fraud, and especially methods able to perform proactive detection.

SUMMARY

According to one aspect, a computer system comprises at least one hardware processor configured, in response to identifying a known fraudulent Internet domain located at an Internet Protocol (IP) address, to select a candidate Internet domain according to whether the candidate Internet domain is located at the IP address. The at least one hardware processor is further configured, in response to selecting the candidate Internet domain, to determine whether the candidate Internet domain satisfies a registration condition according to domain name registration data characterizing the candidate Internet domain. The at least one hardware processor is further configured, in response, when the candidate Internet domain satisfies the registration condition, to analyze an electronic document distributed by the candidate Internet domain to determine whether the electronic document is fraudulent, when the electronic document is fraudulent, to determine that the candidate Internet domain is fraudulent.

According to another aspect, a computer-implemented method of identifying fraudulent Internet domains comprises, in response to identifying a known fraudulent Internet domain located at an Internet Protocol (IP) address, employing at least one hardware processor of a computer system to select a candidate Internet domain according to whether the candidate Internet domain is located at the IP address. The method further comprises, in response to selecting the candidate Internet domain, employing at least one hardware processor of the computer system to determine whether the candidate Internet domain satisfies a registration condition according to domain name registration data characterizing the candidate Internet domain. The method further comprises, in response, when the candidate Internet domain satisfies the registration condition, employing at least one hardware processor of the computer system to analyze an electronic document distributed by the candidate Internet domain to determine whether the electronic document is fraudulent. The method further comprises, in response to analyzing the electronic document, when the electronic document is fraudulent, determining that the candidate Internet domain is fraudulent.

According to another aspect, a non-transitory computer-readable medium stores instructions which, when executed by at least one hardware processor, cause the at least one hardware processor, in response to identifying a known fraudulent Internet domain located at an Internet Protocol (IP) address, to select a candidate Internet domain according to whether the candidate Internet domain is located at the IP address. The instructions further cause at least one processor, in response to selecting the candidate Internet domain, to determine whether the candidate Internet domain satisfies a registration condition according to domain name registration data characterizing the candidate Internet domain. The instructions further cause at least one processor, in response, when the candidate Internet domain satisfies the registration condition, to analyze an electronic document distributed by the candidate Internet domain to determine whether the electronic document is fraudulent. The instructions further cause at least one processor, in response to analyzing the electronic document, when the electronic document is fraudulent, to determine that the candidate Internet domain is fraudulent.

BRIEF DESCRIPTION OF THE DRAWINGS

The foregoing aspects and advantages of the present invention will become better understood upon reading the following detailed description and upon reference to the drawings where:

FIG. 2-A shows an exemplary hardware configuration of a client system according to some embodiments of the present invention.

FIG. 2-B shows an exemplary hardware configuration of a server computer system according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, computer security encompasses protecting equipment and data against illegitimate access, modification, and/or destruction. Unless otherwise specified, the term online fraud is not limited to fraudulent websites, but also encompasses other illegitimate or unsolicited commercial electronic communications such as email, instant messages, and phone text and multimedia messages, among others. An Internet domain (or simply, domain) is a subset of computing resources (real or virtual computer systems, network addresses) owned, controlled, or operated by a particular individual or organization. A fraudulent Internet domain is a domain hosting and/or distributing fraudulent electronic documents. A domain name is an alphanumeric alias representing the respective Internet domain. A fraudulent domain name is a domain name of a fraudulent domain. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alfa, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
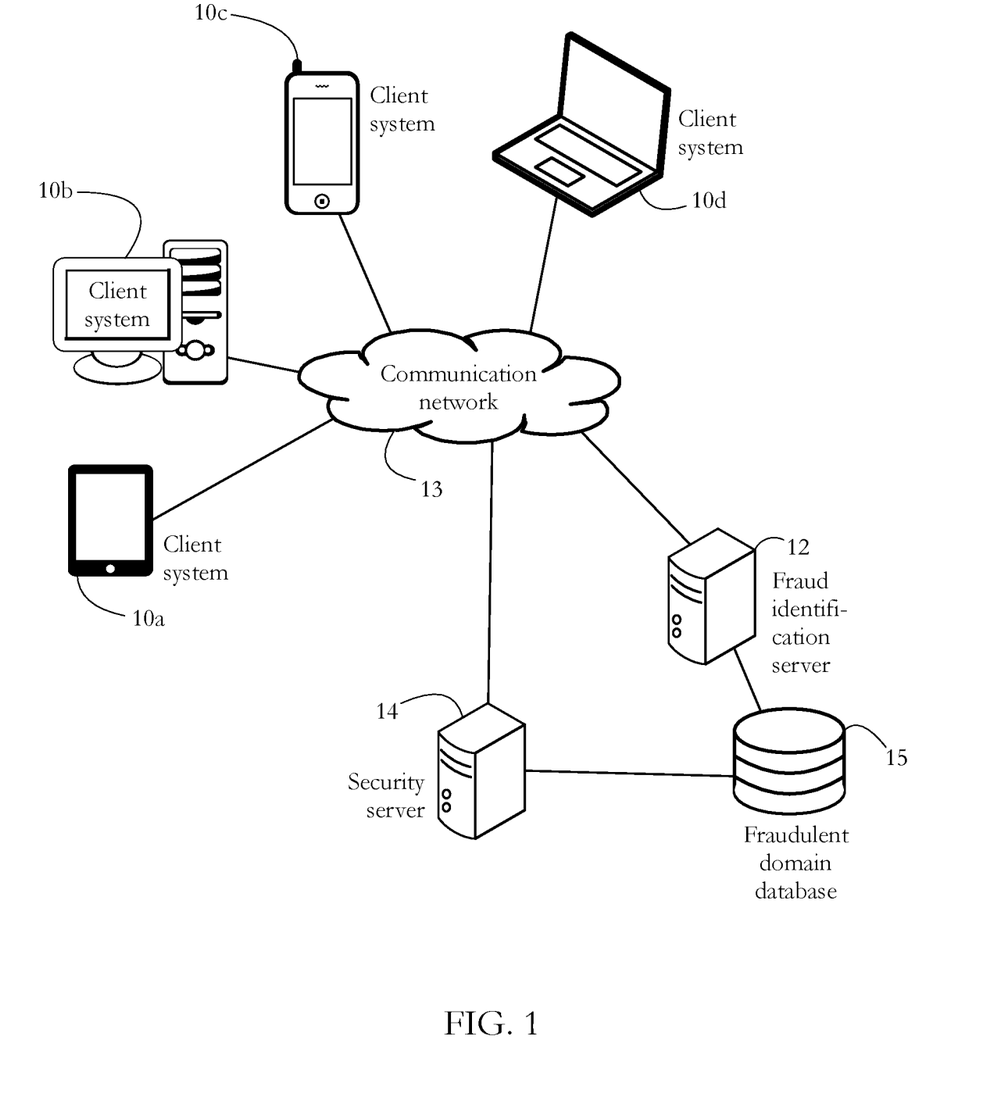
FIG. 1 shows an exemplary set of client systems protected against online fraud according to some embodiments of the present invention.

FIG. 1 shows an exemplary anti-fraud system according to some embodiments of the present invention. A plurality of client systems 10a-d are protected against online fraud by a security server 14 and a fraud identification server 12. Client systems 10a-d generically represent any electronic device having a processor and a memory and being capable of connecting to a communication network. Exemplary client devices include, among others, personal computers, laptops, mobile computing devices (e.g., tablet computers), mobile telephones, wearable devices (e.g., watches, fitness monitors), game consoles, TVs, and household appliances (e.g. refrigerators, media players). Client systems 10a-d are interconnected via a communication network 13, such as a corporate network or the Internet. Parts of network 13 may include a local area network (LAN) and/or a telecommunication network (e.g., 3G network).

Each server 12, 14 generically represents a set of communicatively coupled computer systems, which may not be in physical proximity to each other. In some embodiments, security server 14 is configured to receive a query from a client system, the query indicative of an electronic document such as a webpage or an electronic message, and to respond with an assessment indicator indicating whether the respective document is likely to be fraudulent. In some embodiments, a likelihood of fraud is determined according to a location indicator of the respective document. Exemplary location indicators include a domain name, a hostname, and an Internet Protocol (IP) address of a computer system hosting or distributing the respective electronic document. A domain name is a term commonly used in the art to denote a unique sequence of characters identifying a specific realm of the Internet, owned and/or controlled by an individual or organization. A domain name constitutes an abstraction (e.g., alias) of a set of network addresses (e.g., IP addresses) of computers that host and/or distribute electronic documents. Domain names typically comprise a concatenated sequence of labels, delimited by dots, e.g., www.bitdefender.com.

Fraud identification server 12 is configured to gather information about online fraud, including, for instance, a list of location indicators (domain names, IP addresses, etc.) of fraudulent documents. In some embodiments, fraud identification server 12 stores fraud-indicative information in a fraudulent domain database 15, which may be further used by security server 14 in determining the likelihood that an electronic document is fraudulent. Details of such functionality are given below.

Figure 2:
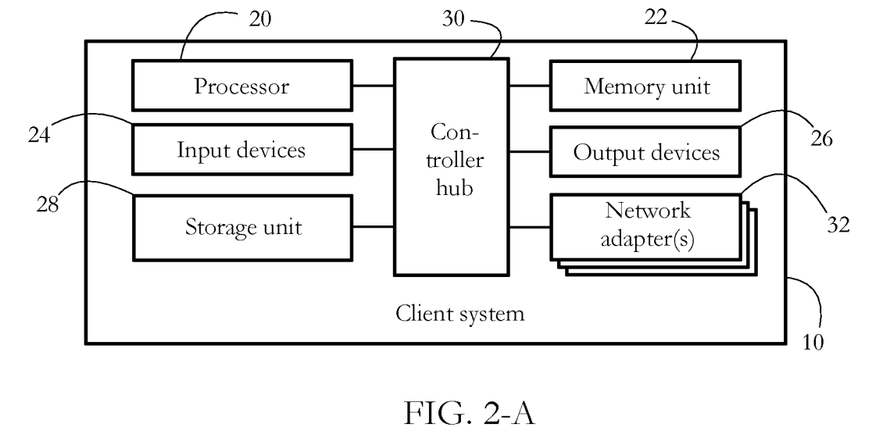

FIG. 2-A shows an exemplary hardware configuration of a client system 10, such as systems 10a-d in FIG. 1. For simplicity, the illustrated client system is a computer system; the hardware configuration of other client systems such as mobile telephones, smartwatches, etc., may differ somewhat from the illustrated configuration. Client system 10 comprises a set of physical devices, including a hardware processor 20 and a memory unit 22. Processor 20 comprises a physical device (e.g. a microprocessor, a multi-core integrated circuit formed on a semiconductor substrate, etc.) configured to execute computational and/or logical operations with a set of signals and/or data. In some embodiments, such operations are indicated to processor 20 in the form of a sequence of processor instructions (e.g. machine code or other type of encoding). Memory unit 22 may comprise volatile computer-readable media (e.g. DRAM, SRAM) storing instructions and/or data accessed or generated by processor 20.

Input devices 24 may include computer keyboards, mice, and microphones, among others, including the respective hardware interfaces and/or adapters allowing a user to introduce data and/or instructions into client system 10. Output devices 26 may include display devices (e.g., monitor, liquid crystal display) and speakers, as well as hardware interfaces/adapters such as graphic cards, allowing client system 10 to communicate data to a user. In some embodiments, input devices 24 and output devices 26 may share a common piece of hardware, for instance a touch-screen device. A storage unit 28 includes computer-readable media enabling the non-volatile storage, reading, and writing of software instructions and/or data. Exemplary storage devices 28 include magnetic and optical disks and flash memory devices, as well as removable media such as CD and/or DVD disks and drives. The set of network adapters 32 enables client system 10 to connect to a computer network and/or to other electronic devices. Controller hub 30 represents the plurality of system, peripheral, and/or chipset buses, and/or all other circuitry enabling the communication between processor 20 and devices 22, 24, 26, 28, and 32. For instance, controller hub 30 may include a memory controller, an input/output (I/O) controller, and an interrupt controller, among others. In another example, controller hub 30 may comprise a northbridge connecting processor 20 to memory 22 and/or a southbridge connecting processor 20 to devices 24, 26, 28, and 32.

FIG. 2-B shows an exemplary hardware configuration of fraud identification server 12 according to some embodiments of the present invention. Security server 14 may have a similar configuration. Fraud identification server 12 comprises at least one hardware processor 120 (e.g., microprocessor, multi-core integrated circuit), a physical memory 122, server storage devices 128, and a set of server network adapters 132. Adapters 132 may include network cards and other communication interfaces enabling fraud identification server 12 to connect to communication network 13. Server storage devices 128 may store at least a subset of records from fraud domain database 15. In an alternative embodiment, server 12 may access fraud records from database 15 via network 13. In some embodiments, server 12 further comprises input and output devices, which may be similar in function to input/output devices 24 and 26 of client system 10, respectively.

Figure 3:
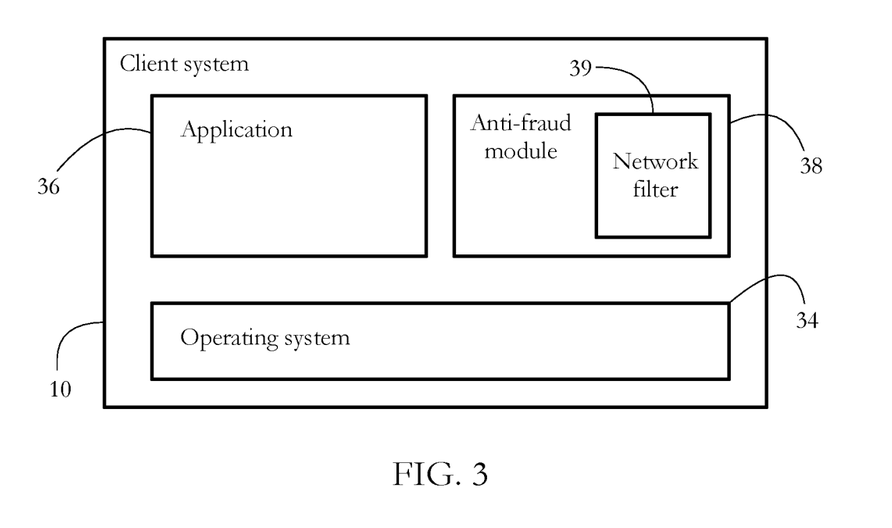
FIG. 3 shows exemplary software components executing on a client system according to some embodiments of the present invention.

FIG. 3 shows exemplary software executing on client system 10 according to some embodiments of the present invention. An operating system (OS) 34 provides an interface between the hardware of client system 10 and a set of software applications. Exemplary OSs include Windows®, MacOS®, iOS®, and Android®, among others. An application 36 generically represents any user application such as word processing, image processing, spreadsheet, calendar, online games, social media, web browser, and electronic communication applications, among others.

An anti-fraud module 38 protects client system 10 against electronic fraud, for instance by preventing client system 10 from accessing a fraudulent electronic document (e.g., fraudulent website, email message, etc.). In some embodiments, the operation of anti-fraud module 38 may be turned on and/or off by a user of client system 10. Anti-fraud module 38 may be a standalone application, or may form a part of a suite of computer programs protecting client system 10 against computer security threats such as malicious software (malware), spyware, and unauthorized intrusion. Module 38 may operate at various levels of processor privilege (e.g., user mode, kernel mode). In some embodiments, module 38 is integrated with application 36, for instance as a plug-in, add-on, or toolbar.

In some embodiments, anti-fraud module 38 may include a network filter 39 configured to intercept a request by client system 10 to access a remote document and to selectively block the respective request. An exemplary access request detected by module 38 comprises a Hypertext Transfer Protocol (HTTP) request issued by client system 10. Network filter 39 may operate, for instance, as a driver registered with OS 34. In an embodiment wherein OS 34 and application 36 execute within a virtual machine, anti-fraud module 38 (or at least network filter 39) may execute outside the respective virtual machine, e.g., at the processor privilege level of a hypervisor. Such configurations may efficiently protect module 38 and/or network filter 39 from malware possibly infecting the virtual machine. In yet another embodiment, anti-fraud module 38 may operate, at least in part, on an electronic device distinct from client system 10, for instance, on a router, proxy server, or gateway device used to connect client system 10 to an extended network such as the Internet.

Figure 4:
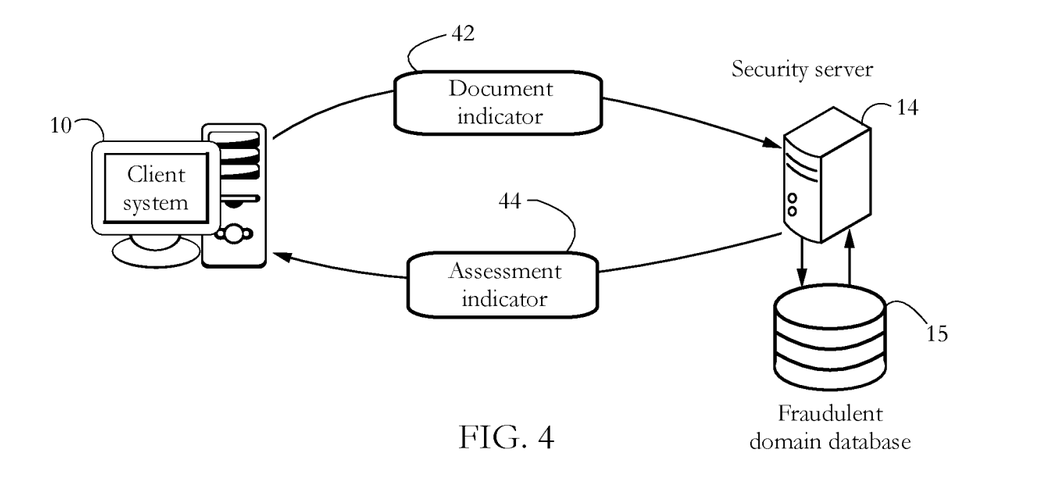
FIG. 4 shows an exemplary data exchange between a client system and a security server, according to some embodiments of the present invention.
Figure 5:
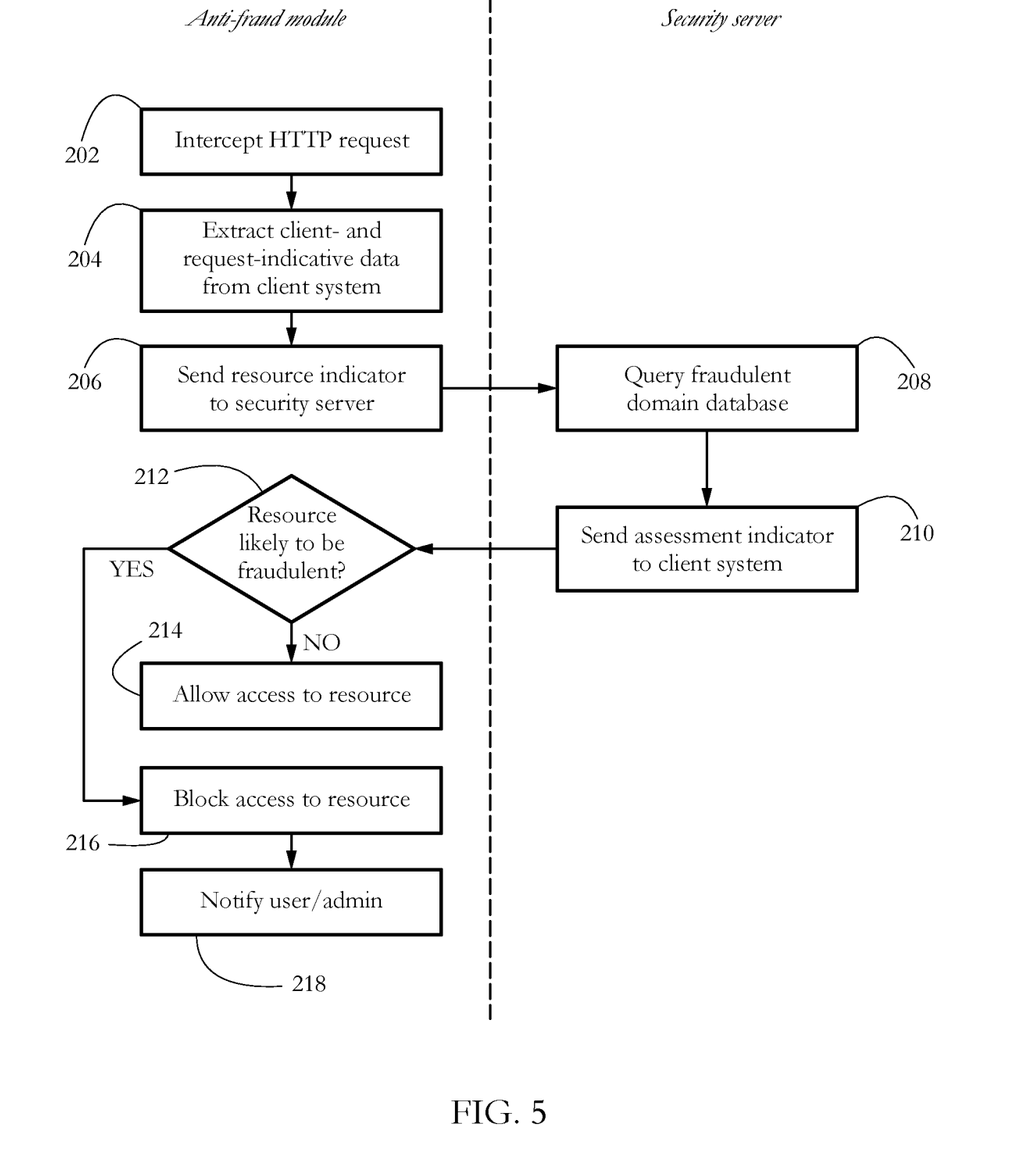
FIG. 5 shows an exemplary sequence of steps performed by the anti-fraud module and security server to protect a client system from electronic fraud according to some embodiments of the present invention.

FIG. 4 illustrates the operation of anti-fraud module 38 via an exemplary data exchange between client system 10 and security server 14. FIG. 5 further shows an exemplary sequence of steps performed by anti-fraud module 38 and/or security server 14 to protect client system 10 against electronic fraud according to some embodiments of the present invention. In an illustrative example wherein application 36 comprises a web browser, when a user attempts to access a remote document (e.g., website), application 36 may send a request to access the respective document over communication network 13 to a service provider server. A typical request may include an encoding of a location of the respective resource. Exemplary location encodings include a domain name, a hostname, a Uniform Resource Identifier (URI), a Uniform Resource Locator (URL), and an Internet Protocol (IP) address, among others.

Upon detecting the access request (e.g., HTTP request issued by a web browser), some embodiments of anti-fraud module 38 at least temporarily suspend transmission of the respective request to its intended destination, and instead transmit a document indicator 42 to security server 14. In some embodiments, document indicator 42 includes the encoding of the location of the requested document (e.g., domain name, URL, IP address), and may further include other information obtained by anti-fraud module 38 by analyzing the intercepted access request. Such information may include an indicator of a type of the requested document, an indicator of a requesting application, and an identifier of a requesting user, among others. In response to receiving document indicator 42, in a sequence of steps 208-210 (FIG. 5), some embodiments of security server 14 formulate an assessment indicator 44 indicating whether the requested document is likely to be fraudulent, and transmit indicator 44 to client system 10. In some embodiments, the likelihood of fraud is quantified as a Boolean value (e.g., 0/1, YES/NO), or as a number between a lower and an upper limit (e.g., between 0 and 100).

In some embodiments, in a step 212, anti-fraud module 38 determines according to assessment indicator 44 whether the requested document is likely to be fraudulent. When yes, a step 214 allows client system 10 (e.g., application 36) to access the respective document, for instance by transmitting the original access request to its intended destination. When no, a step 216 may block access to the respective document. Some embodiments may further display a notification to the user (e.g., a warning screen, icon, explanation etc.) and/or may notify a system administrator of client system 10.

In an alternative embodiment, anti-fraud module 38 executing on client system 10 or on a router connecting client system 10 to the Internet may redirect all requests to access remote documents to security server 14 for analysis. Security server 14 may thus be placed in a position of a proxy server between client system 10 and the remote servers providing access to the respective resources. In such embodiments, steps 212-214-216 may be executed by security server 14.

In an exemplary embodiment protecting a user of client system 10 from fraudulent electronic messages (e.g., email), anti-fraud module 38 may be installed as a plugin or add-on to a message reader application. Upon receiving a message, module 38 may parse a header of the respective message to extract a document indicator comprising, for instance, an electronic address of a sender of the respective message and/or a domain name of the email server delivering the respective message. Module 38 may then transmit document indicator 42 to security server 14 and in response, receive assessment indicator 44 from server 14. Anti-fraud module 38 may determine according to indicator 44 whether the respective message is likely to be fraudulent, and when yes, prevent the display of a content of the respective message to the user. In some embodiments, module 38 may place a message deemed likely to be fraudulent into a separate message folder.

In an alternative embodiment, anti-fraud module 38 may execute on a server computer system (e.g., email server) managing electronic messaging on behalf of multiple client systems, e.g., client systems 10a-d in FIG. 1. In response to determining that a message is likely to be fraudulent, module 38 may block distribution of the respective message to its intended recipient.

In determining the likelihood of fraud, security server 14 may query fraudulent domain database 15 (step 208 in FIG. 5). In some embodiments, database 15 comprises a set of records, each record corresponding to a fraudulent domain name; such sets of records are sometimes known in the art as blacklists. In some embodiments, step 208 comprises determining whether a domain name indicated by document indicator 42 matches any blacklisted record of database 15. When yes, security server 14 may determine that the requested document is likely to be fraudulent.

Figure 6:
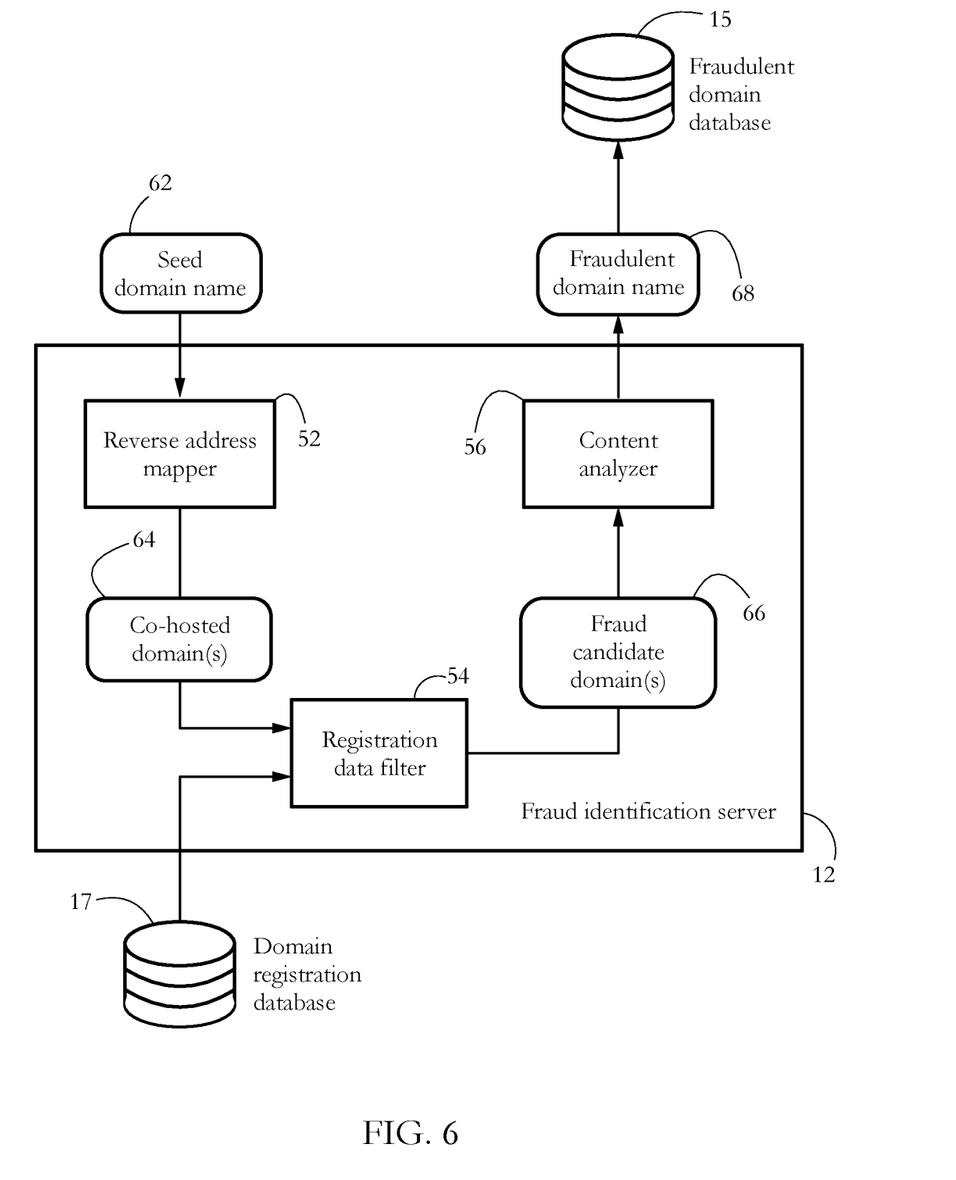
FIG. 6 illustrates exemplary components of a fraud identification server according to some embodiments of the present invention.
Figure 7:
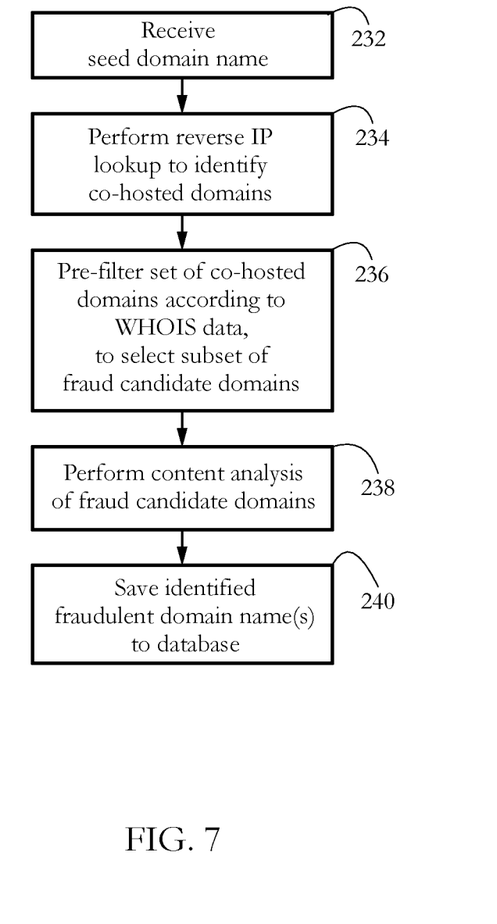
FIG. 7 shows an exemplary sequence of steps performed by the fraud identification server according to some embodiments of the present invention.

Fraudulent domain database 15 may be populated and maintained by fraud identification server 12. In some embodiments, server 12 identifies a set of previously unknown fraudulent domains based on knowledge derived from analyzing a known fraudulent Internet domain, herein termed seed domain. Domain names of newly discovered fraudulent domains may then be added to database 15. FIG. 6 illustrates exemplary components of fraud identification server 12 according to some embodiments of the present invention. Server 12 may comprise a reverse address mapper 52, a registration data filter 54 connected to reverse address mapper 52, and a content analyzer 56 connected to filter 54. FIG. 7 shows an exemplary sequence of steps performed by fraud identification server 12 to discover fraudulent Internet domains according to some embodiments of the present invention.

Some embodiments of the present invention rely on the observation that a physical computing resource which belongs to one fraudulent domain often belongs to other fraudulent domains as well. For instance, the same server and/or IP address may host a plurality of fraudulent websites. Such servers or network addresses may be owned by fraudsters, or may be hijacked without the knowledge of their rightful owner/operator, e.g., by using carefully crafted malicious software. The description below shows how knowledge of one fraudulent domain may be used to uncover other, previously unknown, fraudulent domains.

In some embodiments, reverse address mapper 52 is configured to receive an indicator of a seed domain (for instance, a seed domain name 62 in FIG. 6) and to output a set of co-hosted domains 64 (step 234 in FIG. 7). The seed domain represents a known fraudulent domain, i.e., a domain known to host or distribute fraudulent documents. Examples of such domains include domains hosting fake bank websites, fake online betting sites, fake loan sites, etc. Seed domain names may be detected, for instance, by researchers at a computer security company, or may be reported by Internet users or by authorities investigating online fraud. Seed domain names may also be discovered automatically by an array of tools known in the art, for instance honeypots.

In some embodiments, co-hosted domains 64 comprise a set of domains sharing a common network address with the seed domain (for instance, a common IP address). An exemplary set of co-hosted domains 64 use the same physical server to distribute electronic documents. Since a single network/IP address may correspond to a plurality of distinct computer systems, co-hosted domains 64 may not necessarily include the same physical machine as the seed domain. However, a domain name server would map seed domain name 62 and the domain names of all co-hosted domains 64 to the same network address. To identify co-hosted domains 64, fraud identification server 12 may use any method known in the art of computer networking. Such operations are commonly known as reverse IP analysis, reverse Domain Name System (DNS) lookup, or reverse DNS resolution. In one exemplary approach, server 12 operates a name server used to perform direct DNS lookups (i.e., determining an IP address according to a domain name), and uses the name server to build a reverse DNS map. Another approach may look up the pointer DNS record type (PTR record) of a particular domain, e.g., in-addr.arpa or ip6.arpa.

Not all co-hosted domains 64 need to be fraudulent. As described above, sometimes a computer system belonging to a legitimate domain is hijacked by fraudsters, which then use the respective machine to host a set of fraudulent domains. Sometimes, such fraudulent domains are hosted on the respective machine only for a brief period of time, and then moved to another server to avoid detection or countermeasures. In some embodiments, registration data filter 54 of fraud identification server 12 is configured to filter the set of co-hosted domains 64 to select a set of fraud candidate domains 66 (step 236 in FIG. 7), representing domains suspected of being fraudulent. Fraud candidate domains 66 may undergo further scrutiny, as shown below.

Step 236 may be seen as an optimization, since fraud analysis as shown below may be computationally expensive. Pre-filtering the set of co-hosted domains 64 may lower the computational burden by using relatively less expensive rules to select a subset of candidate domains for fraud analysis. Some embodiments of registration data filter 54 select fraud candidate domains 66 according to a domain name registration record of each co-hosted domain. Registration records are generated and/or maintained by a domain registration authority (e.g., an Internet registrar). For each registered domain name, an exemplary registration record may include contact data for the respective domain name's registrant, owner, or administrator (e.g., name, address, telephone number, email address, etc.), as well as automatically generated data such as a registrar's ID, and various timestamps indicating a moment in time when the respective domain name was registered, when the respective registration record was last modified, when the respective registration record expires, etc.

Some domain name registration data is public, and may be queried via specific computer instructions and/or protocols such as WHOIS. In some embodiments, registration data filter 54 to obtains domain name registration data related to co-hosted domains 64 from a domain registration database 17, for instance by using the WHOIS protocol. Filter 54 may then search within each co-hosted domain's domain name registration data for a set of fraud-indicative patterns, to determine whether a domain is likely to be fraudulent or not. Some embodiments rely on the observation that the registration of fraudulent domain names is often clustered in time (bursts of domain name registrations); such embodiments may compare a registration time stamp of the seed domain name 62 with a registration time stamp of a co-hosted domain 64, and select the respective co-hosted domain into the set of fraud candidate domains 66 according to a result of the comparison (e.g., when the two registrations are very close to each other in time).

Another exemplary fraud-indicative feature is the domain name's registrant (e.g., owner, administrator, etc.). Some embodiments of filter 54 may try to match the registrant's credentials to a list of known names, telephone numbers, addresses, emails, etc., harvested from the domain name registration data of known fraudulent domains, such as seed domain name 62. A match may indicate that the respective co-hosted domain is likely to be fraudulent, therefore justifying inclusion of the respective co-hosted domain into the set of fraud candidates 66.

In some embodiments, filter 54 may look for certain fraud-indicative features of a registrant's telephone number. In one example, some area or country codes may be considered fraud-indicative. In another example, certain digit combinations within telephone numbers correspond to automatic call redirection services; the respective telephone number may appear to be a legitimate number but calling it would result in the respective call being redirected to another number, possibly in another country. Such call redirection patterns may be considered fraud-indicative. Some embodiments of registration data filter 54 may perform a reverse phone number lookup and compare a result of the lookup with other domain registration data such as an address or a name. Any discrepancy may be considered fraud-indicative, and may result in the inclusion of the respective co-hosted domain into the fraud candidate set.

Yet another exemplary criterion for selecting a domain into the set of fraud candidate domains 66 is the registrant's email address. Some embodiments of filter 54 may try to match the respective email address to a blacklist of email addresses harvested from known fraudulent documents (e.g., webpages, email messages). The blacklist may further comprise email addresses harvested from the domain registration data of known fraudulent domains. Some embodiments of filter 54 may look for certain patterns in the registrant's email, such as apparently random sequences of characters, unusually long email addresses, etc. Such patterns may indicate that the respective address was automatically generated, which may be fraud-indicative. In some embodiments, filter 54 may determine whether to include a co-hosted domain into the fraud candidate set according to a provider of an email address, e.g., according to whether the respective provider allows anonymous email accounts, according to whether the respective email addresses are provided free of charge, etc. Some embodiments may identify an email server handling email destined for and/or originating from the respective email address, and determine whether to include a co-hosted domain into the fraud candidate set according to the identity of such a server.

In response to selecting fraud candidate domains 66, in some embodiments, content analyzer 56 performs a content analysis to determine whether any of the set of fraud candidate domains is actually fraudulent (step 238 in FIG. 7). Content analysis may comprise accessing a fraud candidate domain and analyzing a content of an electronic document hosted or distributed by the respective domain. When the content analysis determines that the electronic document is fraudulent, a step 240 may determine that the respective fraud candidate domain is indeed fraudulent, and may save the newly identified fraudulent domain name to fraudulent domain database 15.

Exemplary content analysis of a hypertext markup language (HTML) document includes, among others, determining whether the respective document comprises a user authentication (login) page. Such determinations may include determining whether the respective webpage contains a form field and/or any of a plurality of user authentication keywords (e.g. "username", "password", names and/or acronyms of financial institutions).

Content analysis may further include comparing the respective HTML document to a set of known fraudulent documents and/or to a set of legitimate documents. Some embodiments determine that a document is fraudulent when the respective document is sufficiently similar to a known fraudulent document. Such methods rely on the observation that fraudsters often reuse a successful document template, so there are typically several fraudulent documents that use approximately the same design and/or formatting.

However, a document may be fraudulent also when it is sufficiently similar to a particular legitimate document. In one such example, a webpage may try to deceive users by masquerading as a legitimate webpage of a financial institution (e.g., a bank, an insurance company, etc.). Some embodiments of content analyzer 56 therefore use content analysis to determine whether a HTML document located at a fraud candidate domain is an illegitimate clone of a legitimate webpage. Such determinations may include analyzing a set of graphic elements of the document under scrutiny (e.g., images, logos, color schemes, fonts, font style, font size, etc.) and comparing such elements to graphic elements harvested from a set of legitimate webpages.

Content analysis may further comprise analysis of a text part of the respective electronic document. Such text analysis may include searching for certain keywords, computing the frequency of occurrence of certain words and/or word sequences, determining the relative position of certain words with respect to other words, etc. Some embodiments determine an inter-document distance indicative of a degree of similarity between a target document and a reference document (either fraudulent or legitimate), and determine whether the target document is legitimate according to the calculated distance.

Another example of content analysis based on text comprises identifying and extracting contact information from an electronic document such as a HTML document or email message (e.g., an address, a contact telephone number, a contact email address, etc.). Content analyzer 56 may then try to match the respective contact data to a blacklist of similar data extracted from known fraudulent documents. For instance, when a webpage lists a contact telephone number that appears on a fraudulent website, some embodiments may conclude that the webpage is also fraudulent. Other embodiments look for fraud-indicative patterns in the contact data, for instance for telephone numbers with certain country and/or area codes, patterns of telephone number digits that indicate call redirection services, etc. (see above, in relation to analysis of domain registration data).

Another exemplary set of content analysis methods identifies snippets of code placed within an electronic document, such as traffic tracking code. An example of such code is used by web analytics services (e.g., Google® Analytics®) to calculate and report various data related to the use of a webpage: number of visits, referrers, country of origin for the visits, etc. Such code typically comprises a unique client ID (e.g., tracking ID) that allows the respective analytic service to associate the respective electronic document with a particular client. Some embodiments of content analyzer 56 may identify a tracking ID and try to match the respective ID to a blacklist of such IDs harvested from known fraudulent documents. A match may indicate that the currently analyzed document is also fraudulent.

The exemplary systems and methods described above allow an automatic detection of Internet fraud, for instance of fraudulent webpages and electronic messages. Some embodiments identify automatically identify a fraudulent Internet domain name, i.e., a name of a domain hosting or distributing fraudulent documents, and prevent a user from accessing the respective fraudulent domain name. Alternative embodiments display an alert and/or notify a system administrator when an attempt is made to access a known fraudulent domain name.

Some embodiments automatically discover a set of previously unknown fraudulent domain names based on knowledge derived from analyzing a known fraudulent domain name. Such automatic detection enables a swift response to emerging fraud attempts, and may even allow a proactive approach to fraud prevention by detecting domain names which have been registered, but have not been used yet to carry out fraudulent activities.

Some embodiments select fraud candidate domains from among a set of domains hosted on the same machine(s) as the known fraudulent domain. The candidate set may be further pruned according to domain registration data. Content analysis may then be used to identify the truly fraudulent domains within the set of candidates.

It will be clear to a skilled artisan that the above embodiments may be altered in many ways without departing from the scope of the invention. Accordingly, the scope of the invention should be determined by the following claims and their legal equivalents.

What is claimed is:

1. A computer system comprising at least one hardware processor configured to:
    in response to identifying a known fraudulent Internet domain located at an Internet Protocol (IP) address, select a candidate Internet domain according to whether the candidate Internet domain is located at the IP address;
    in response to selecting the candidate Internet domain, determine whether the candidate Internet domain satisfies a registration condition according to domain name registration data characterizing the candidate Internet domain;
    in response, when the candidate Internet domain satisfies the registration condition, analyze an electronic document distributed by the candidate Internet domain to determine whether the electronic document is fraudulent;
    in response to analyzing the electronic document, when the electronic document is fraudulent, determine that the candidate Internet domain is fraudulent; and
    in response to determining that the candidate Internet domain is fraudulent, transmit a fraud assessment indicator to another computer system, the fraud assessment indicator configured to cause the other computer system to block access to a resource hosted by the candidate Internet domain.

2. The computer system of claim 1, wherein determining whether the candidate Internet domain satisfies the registration condition comprises comparing domain name registration data characterizing the candidate Internet domain with domain name registration data characterizing the known fraudulent Internet domain.

3. The computer system of claim 2, wherein determining whether the candidate Internet domain satisfies the registration condition comprises comparing a registration timestamp of the candidate Internet domain to a registration timestamp of the known fraudulent Internet domain.

4. The computer system of claim 1, wherein domain name registration data characterizing the candidate Internet domain comprises an email address, and wherein the at least one hardware processor is configured to determine whether the candidate Internet domain satisfies the registration condition according to the email address.

5. The computer system of claim 4, wherein the at least one hardware processor is configured to determine whether the candidate Internet domain satisfies the registration condition according to at least one of a length of the email address and a randomness of the email address.

6. The computer system of claim 4, wherein the at least one hardware processor is configured to determine whether the candidate Internet domain satisfies the registration condition according to an identity of a mail server handling email sent to the email address.

7. The computer system of claim 4, wherein the at least one hardware processor is configured to determine whether the candidate Internet domain satisfies the registration condition according to whether a provider of the email address allows anonymous email accounts.

8. The computer system of claim 1, wherein domain name registration data characterizing the candidate Internet domain comprises a telephone number, and wherein the at least one hardware processor is configured to determine whether the candidate Internet domain satisfies the registration condition according to the telephone number.

9. The computer system of claim 8, wherein determining whether the candidate Internet domain satisfies the registration condition comprises performing a reverse telephone number lookup to determine an entity owning the telephone number.

10. A computer-implemented method of identifying fraudulent Internet domains, the method comprising:
    in response to identifying a known fraudulent Internet domain located at an Internet Protocol (IP) address, employing at least one hardware processor of a computer system to select a candidate Internet domain according to whether the candidate Internet domain is located at the IP address;
    in response to selecting the candidate Internet domain, employing at least one hardware processor of the computer system to determine whether the candidate Internet domain satisfies a registration condition according to domain name registration data characterizing the candidate Internet domain;

in response, when the candidate Internet domain satisfies the registration condition, employing at least one hardware processor of the computer system to analyze an electronic document distributed by the candidate Internet domain to determine whether the electronic document is fraudulent;

in response to analyzing the electronic document, when the electronic document is fraudulent, employing at least one hardware processor of the computer system to determine that the candidate Internet domain is fraudulent; and in response to determining that the candidate Internet domain is fraudulent, employing at least one hardware processor of the computer system to transmit a fraud assessment indicator to another computer system, the fraud assessment indicator configured to cause the other computer system to block access to a resource hosted by the candidate Internet domain.

11. The method of claim 10, wherein determining whether the candidate Internet domain satisfies the registration condition comprises comparing domain name registration data characterizing the candidate Internet domain with domain name registration data characterizing the known fraudulent Internet domain.

12. The method of claim 11, wherein determining whether the candidate Internet domain satisfies the registration condition comprises comparing a registration timestamp of the candidate Internet domain to a registration timestamp of the known fraudulent Internet domain.

13. The method of claim 10, wherein domain name registration data characterizing the candidate Internet domain comprises an email address, the method comprising determining whether the candidate Internet domain satisfies the registration condition according to the email address.

14. The method of claim 13, comprising determining whether the candidate Internet domain satisfies the registration condition according to at least one of a length of the email address and a randomness of the email address.

15. The method of claim 13, comprising determining whether the candidate Internet domain satisfies the registration condition according to an identity of a mail server handling email sent to the email address.

16. The method of claim 13, comprising determining whether the candidate Internet domain satisfies the registration condition according to whether a provider of the email address allows anonymous email accounts.

17. The method of claim 10, wherein domain name registration data characterizing the candidate Internet domain comprises a telephone number, the method comprising determining whether the candidate Internet domain satisfies the registration condition according to the telephone number.

18. The method of claim 17, wherein determining whether the candidate Internet domain satisfies the registration condition comprises performing a reverse telephone number lookup to determine an entity owning the telephone number.

19. A non-transitory computer-readable medium storing instructions which, when executed by at least one hardware processor of a computer system, cause the at least one hardware processor to perform the steps of:

in response to identifying a known fraudulent Internet domain located at an Internet Protocol (IP) address, selecting a candidate Internet domain according to whether the candidate Internet domain is located at the IP address;

in response to selecting the candidate Internet domain, determining whether the candidate Internet domain satisfies a registration condition according to domain name registration data characterizing the candidate Internet domain;

in response, when the candidate Internet domain satisfies the registration condition, analyzing an electronic document distributed by the candidate Internet domain to determine whether the electronic document is fraudulent;

in response to analyzing the electronic document, when the electronic document is fraudulent, determining that the candidate Internet domain is fraudulent; and in response to determining that the candidate Internet domain is fraudulent, transmitting a fraud assessment indicator to another computer system, the fraud assessment indicator configured to cause the other computer system to block access to a resource hosted by the candidate Internet domain.

* * * * *